United States Patent
Webb et al.

(10) Patent No.: US 7,053,930 B2
(45) Date of Patent: May 30, 2006

(54) TRIANGULAR BIDIRECTIONAL SCAN METHOD FOR PROJECTION DISPLAY

(75) Inventors: Douglas A. Webb, Los Altos, CA (US); David T. Amm, Sunnyvale, CA (US); Paul A. Alioshin, San Francisco, CA (US); David A. LeHoty, Mountain View, CA (US); Mark A. Koenig, Santa Clara, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 397 days.

(21) Appl. No.: 10/186,212

(22) Filed: Jun. 27, 2002

(65) Prior Publication Data

US 2004/0165069 A1    Aug. 26, 2004

(51) Int. Cl.
*H04N 5/74* (2006.01)
(52) U.S. Cl. ...................................... 348/203
(58) Field of Classification Search ............... 348/206, 348/203, 195, 197, 199–201, 202–205, 441, 348/446, 443, 445
See application file for complete search history.

(56) References Cited

U.S. PATENT DOCUMENTS

| | | | |
|---|---|---|---|
| 3,662,102 A | | 5/1972 | Herndon |
| 4,323,919 A | | 4/1982 | Fujii et al. |
| 4,680,599 A | | 7/1987 | Wertz et al. |
| 4,708,486 A | | 11/1987 | Watanabe |
| 4,782,269 A | * | 11/1988 | Haferl ........................ 315/371 |
| RE33,293 E | | 8/1990 | Yanagi et al. |
| 5,032,924 A | * | 7/1991 | Brown et al. ................ 348/759 |
| 5,168,305 A | | 12/1992 | Sato |
| 5,276,546 A | * | 1/1994 | Palm et al. .................. 359/202 |
| 5,526,050 A | * | 6/1996 | King et al. ............... 348/386.1 |
| 5,595,445 A | | 1/1997 | Bobry |
| 5,895,915 A | * | 4/1999 | DeWeerd et al. ........... 250/234 |
| 6,031,658 A | | 2/2000 | Riza |
| 6,215,579 B1 | | 4/2001 | Bloom et al. |
| 6,429,899 B1 | * | 8/2002 | Nio et al. .................... 348/443 |
| 6,515,781 B1 | | 2/2003 | Lewis et al. |
| 6,552,775 B1 | | 4/2003 | Yanagihara et al. |
| 6,624,914 B1 | | 9/2003 | Hendrix et al. |

(Continued)

OTHER PUBLICATIONS

D.T. Amm, et al. "Grating Light Valve Technology: Update and Novel Applications" May 19, 1998, pp. 1–4, Silicon Light Machines. Presented at the Society for Information Display Symposium, Anaheim, CA.

(Continued)

*Primary Examiner*—Paulos M. Natnael
(74) *Attorney, Agent, or Firm*—Okamoto & Benedicto LLP

(57) ABSTRACT

One embodiment disclosed relates to a method for bi-directional progressive scanning in a display system. The method includes receiving image data for an image to be displayed, forward scanning the image data in a first direction using a linear array of controllable light elements, and reverse scanning the image data in a second direction opposite to the first direction using the linear array. Another embodiment disclosed relates to an apparatus for bi-directional progressive scanning. The apparatus includes a linear array of controllable light elements, and a scanner driver that drives a scanner apparatus using a drive signal that is applied to drive both forward and reverse optical scanning of an image by the linear array.

19 Claims, 8 Drawing Sheets

U.S. PATENT DOCUMENTS 6,795,085 B1 * 9/2004 Doherty et al. ............. 345/596
2002/0171776 A1 11/2002 Tegreene et al.

OTHER PUBLICATIONS

David T. Amm, et al. "Optical Performance of the Grating Light Valve Technology" 1999, pp. 1-8; Silicon Light Machines, Sunnyvale, California.

R.W. Corrigan, "An Alternative Architecture for High Performance Display" Nov. 20, 1999, pp. 1-5, Silicon Light Machines. Presented at the SMPTE Technical Conference and Exhibition, New York, NY.

PCT International Search Report for PCT/US03/17016 mailed Nov. 13, 2003, total of 3 sheets.

* cited by examiner

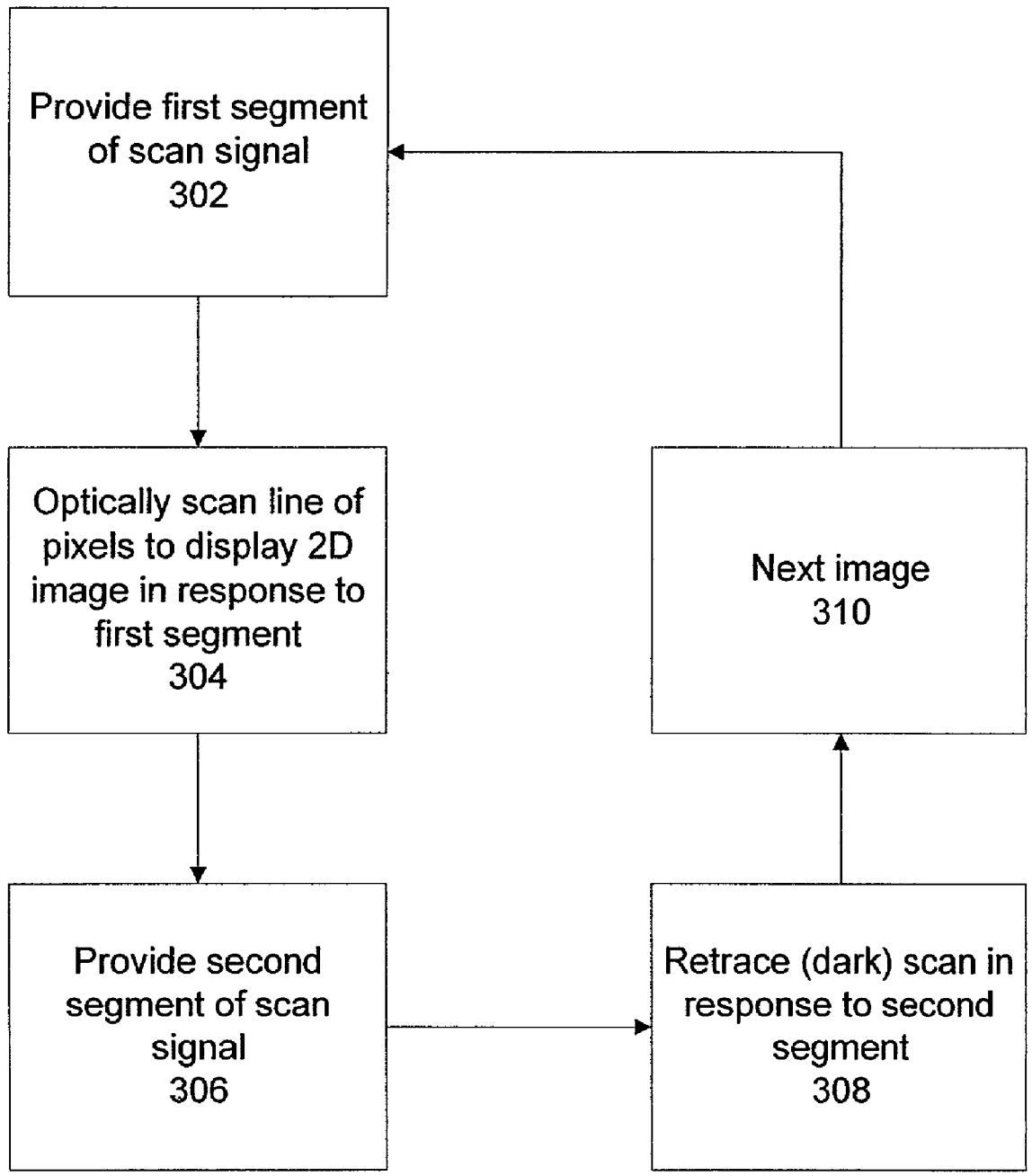
FIG. 3          300

Forward optical scan

Reverse optical scan

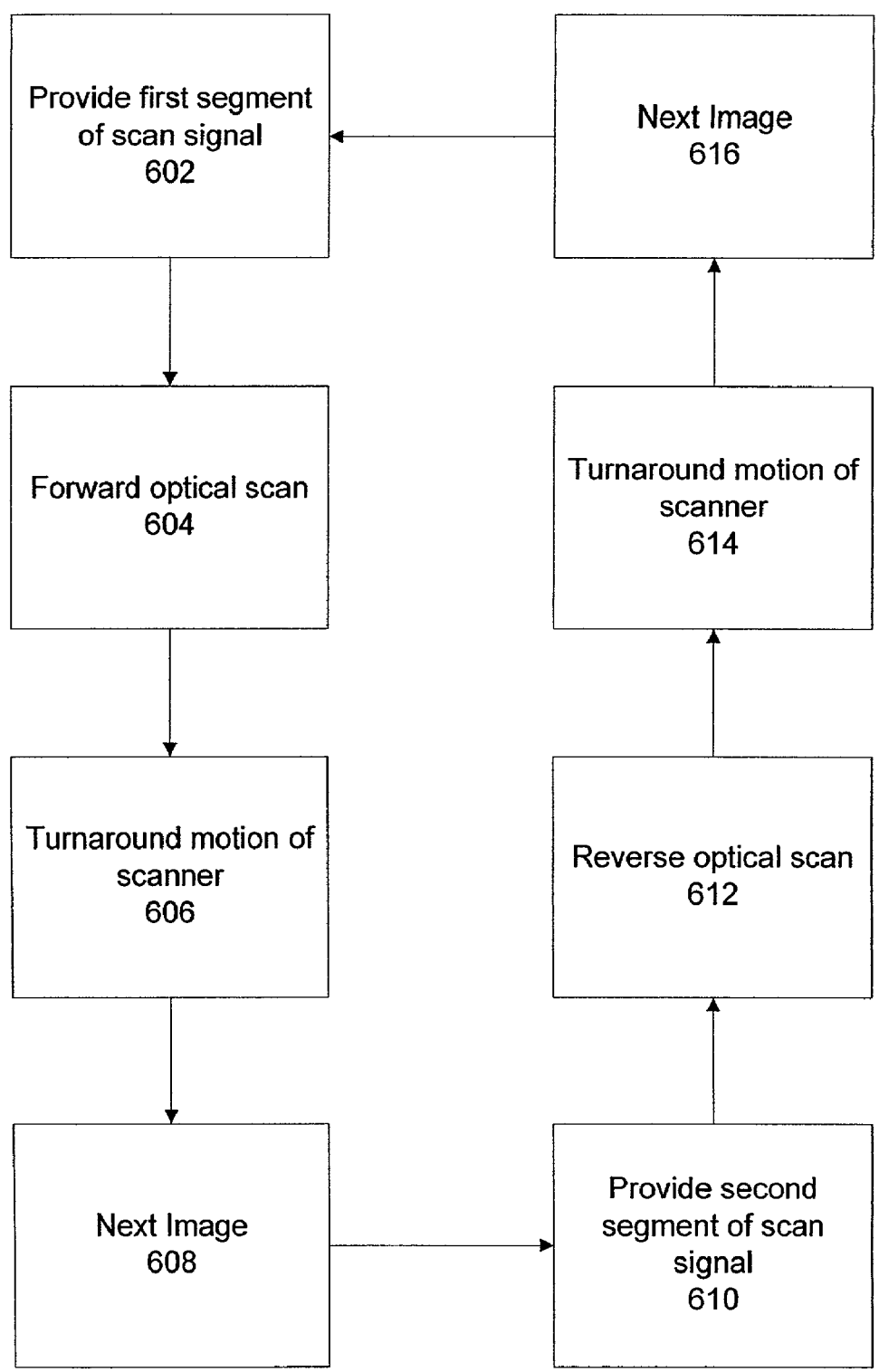
FIG. 6     600

TRIANGULAR BIDIRECTIONAL SCAN METHOD FOR PROJECTION DISPLAY

BACKGROUND OF THE INVENTION

1. Field of the Invention

The present invention relates generally to display systems, and more particularly to projection display systems.

2. Description of the Background Art

A two-dimensional projection image may be formed by using one or more linear arrays of light-modulating pixels. The light-modulating pixels may comprise, for example, GRATING LIGHT VALVE (GLV) pixels. Publications describing GLV devices and their application to display systems include: "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; "Optical Performance of the Grating Light Valve Technology," David T. Amm and Robert W. Corrigan of Silicon Light Machines, a paper presented at Photonics West-Electronics Imaging, 1999; "An Alternative Architecture for High Performance Display," R. W. Corrigan, B. R. Lang, D. A. LeHoty, and P. A. Alioshin of Silicon Light Machines, a paper presented at the 141st SMPTE Technical Conference and Exhibition, Nov. 20, 1999, New York, N.Y.; and U.S. Pat. No. 6,215,579, entitled "Method and Apparatus for Modulating an Incident Light Beam for Forming a Two-Dimensional Image," and assigned at issuance to Silicon Light Machines. The above-mentioned publications are hereby incorporated by reference in their entirety.

In such display systems, the linear array modulates an incident light beam to display pixels along a column (or, alternatively, a row) of the two-dimensional (2D) image. A scanning system is used to move the column across the screen such that each light-modulating pixel is able to generate a row of the 2D image. In this way, the entire 2D image is displayed.

There are challenges, however, in implementing a scanning system that efficiently renders a high quality video image. For example, one measure of the efficiency of the scanning system is its duty cycle. The duty cycle indicates the fraction of time during which the image is being actively rendered on-screen and the fraction of time during which no image is being actively rendered. The higher the duty cycle is; the higher the efficiency is. Hence, achieving a high duty cycle is one challenge.

As another example, the quality of the video image depends on a number of factors. One factor is the refresh rate. The refresh rate is the rate at which an image is displayed upon the screen. Low refresh rates result in a video image that appears to "flicker" to a viewer. Sufficiently high refresh rates are desirable to reduce or eliminate flicker in the video image, and achieving a high refresh rate is another challenge.

SUMMARY

The above-described challenges may be overcome by the present invention. One embodiment of the invention relates to a method for bi-directional progressive scanning in a display system. The method includes receiving image data for an image to be displayed, forward scanning the image data in a first direction using a linear array of controllable light elements, and reverse scanning the image data in a second direction opposite to the first direction using the linear array. Another embodiment of the invention relates to an apparatus for bi-directional progressive scanning. The apparatus includes a linear array of controllable light elements, and a scanner driver that drives a scanner apparatus using a drive signal that is applied to drive both forward and reverse optical scanning of an image by the linear array.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 3 is a flow chart depicting a conventional method of progressive scanning.

FIG. 6 is a flow chart depicting a method for bi-directional progressive scanning in accordance with an embodiment of the present invention.

The use of the same reference label in different drawings indicates the same or like components. Drawings are not to scale unless otherwise noted.

DETAILED DESCRIPTION

Various types of scanners may be used to move the column (or row) of light across the screen. For example, galvonometer-based scanners, resonant scanners, polygon scanners, rotating prisms, or other types of scanners may be used.

A drive signal is applied to the scanner to control ("drive") the movement of the column (or row) of light. For example, to achieve a progressive scan of the column across the screen (e.g., from left to right), a sawtooth drive signal may be used.

Figure 1:
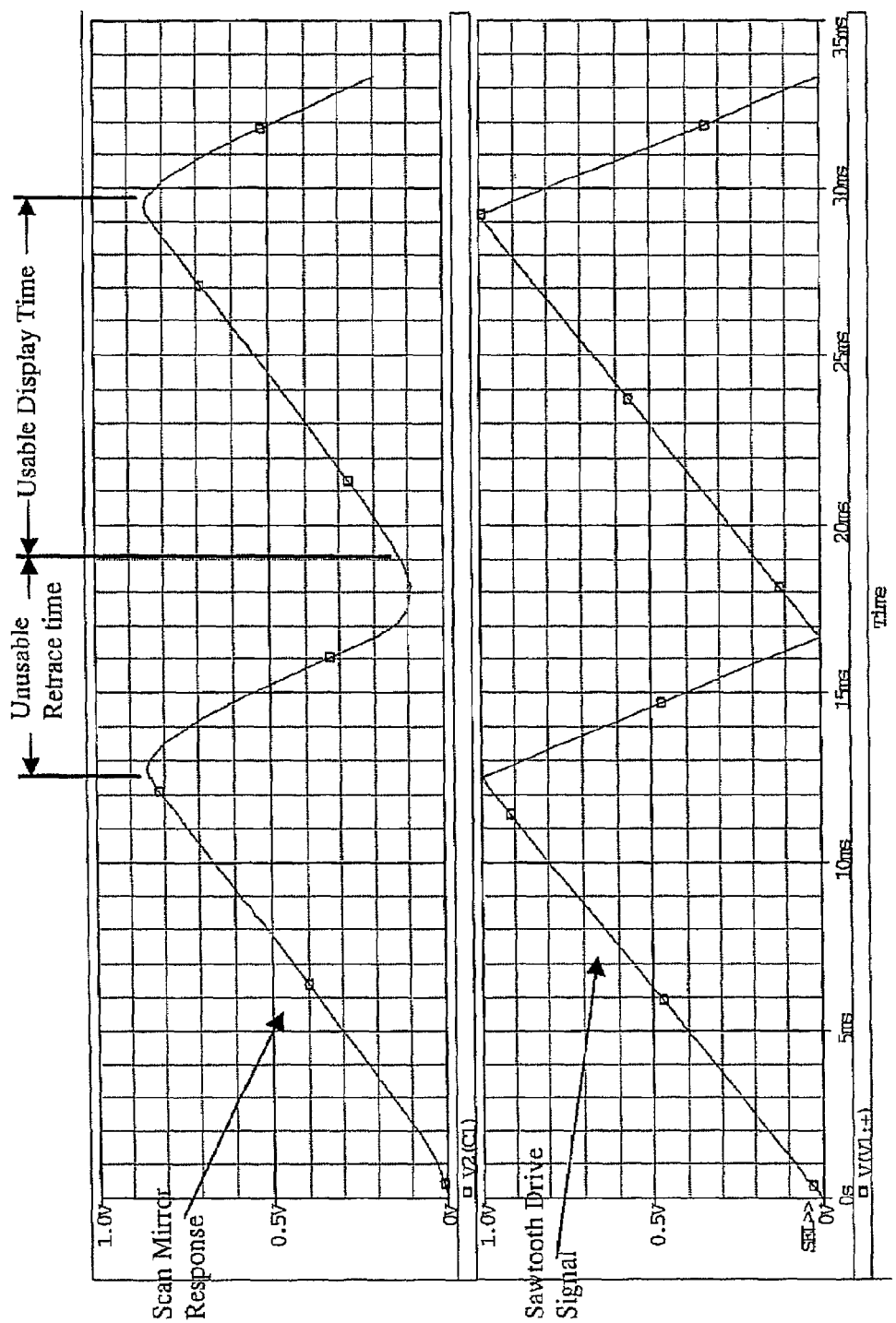
FIG. 1 is a timing diagram depicting a sawtooth drive signal and corresponding scan mirror response for progressive scanning.

FIG. 1 is a timing diagram depicting a sawtooth drive signal and corresponding scan mirror response for progressive scanning. As shown in the bottom portion of FIG. 1, a sawtooth drive signal (also called a sawtooth scan signal) may be generated and used to drive the scan mirror. During each cycle of the sawtooth signal, a first segment goes from a first voltage (for example, zero volts) to a second voltage (for example, one volt), and a second segment goes from the second voltage back to the first voltage. As depicted, the first segment is typically longer and less steep in slope than the second segment.

The scan mirror response to the sawtooth scan signal is shown in the top portion of FIG. 1. The scan mirror response generally follows the sawtooth scan signal and so the scan mirror response also has a first (less steep) segment and a second (more steep) segment in each cycle. However, because of physical limitations of the scan mirror mechanisms, the slope of the scan mirror response cannot change as quickly as the slope of the scan signal can change. Hence, the tips of the scan mirror response are rounded in comparison to the tips of the sawtoooth scan signal.

The first (less steep) segment of the scan mirror response provides a usable display time during which the column of light moves across the screen (for example, from left to right) to paint the 2D image. Meanwhile, the second (more steep) segment of the scan mirror response is used to move (for example, from right to left) the scan mirror's position back to the starting point of the first segment. During this second segment, the column of light is turned off so that the retracement to the starting point is not visible on the screen.

Figure 2A:
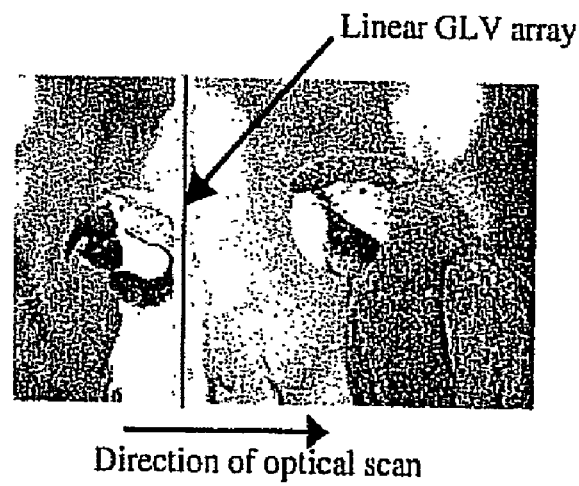
FIGS. 2A and 2B are illustrations depicting an optical scan and a dark retrace scan in progressive scanning.
Figure 2B:
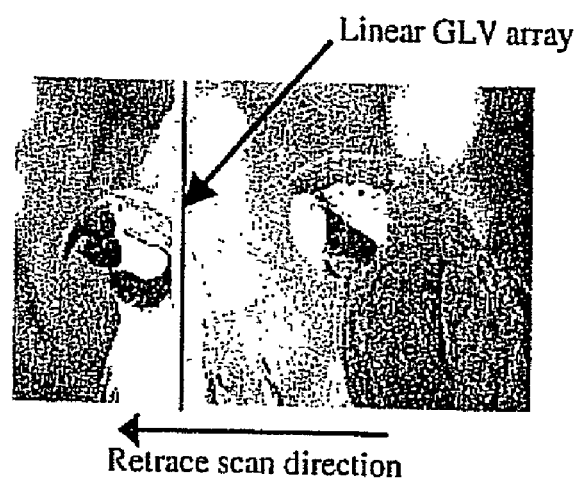

FIGS. 2A and 2B are illustrations depicting an optical scan and a dark retrace scan in progressive scanning. The example of FIG. 2A corresponds to the first (usable) segment of the scan signal. This first segment may be referred to as the optical scan segment as during this segment the 2D image is formed by sweeping the column of pixels across the screen. FIG. 2A indicates a position of the column of pixels provided by the linear GLV (or other similar) array as the column sweeps across the 2D image, for example, from left to right.

The example of FIG. 2B corresponds to the second (unusable) segment of the scan signal. This second segment may be referred to as the retrace scan segment as during this segment the column of pixels is turned off (made dark) as the column returns to the starting position of the optical scan. FIG. 2B indicates a position of the column of pixels provided by the linear GLV (or other similar) array as the now dark column returns across the 2D image, for example, from right to left.

FIG. 3 is a flow chart depicting a conventional method of progressive scanning. The method 300 as depicted includes five steps (302, 304, 306, 308, and 310).

In the first step 302, the first segment of the scan signal is provided. This step 302 corresponds to providing the less steep (longer) segment of the sawtooth drive signal as illustrated in FIG. 1.

In the second step 304, the column (or row) of pixels is optically scanned to display the 2D image in response to the first segment of the scan signal. This step 304 corresponds to the optical scan illustrated in FIG. 2A.

In the third step 306, the second segment of the scan signal is provided. This step 306 corresponds to providing the more steep (shorter) segment of the sawtooth drive signal as illustrated in FIG. 1. In the fourth step 308, the column (or row) of pixels is retraced (without illumination) back to the starting position of the optical scan in response to the second segment of the scan signal. This step 308 corresponds to the retrace scan illustrated in FIG. 2B.

Finally, in the fifth step 310, the method 300 proceeds to a next image. The next image may comprise, for example, a next frame of a video sequence. Alternatively, the next image may be a refresh of the same frame of the video sequence. Subsequently, the method 300 begins again starting with the first step 302.

The efficiency or duty cycle of the progressive scanning depicted in FIGS. 1–3 is given by the usable display time divided by the cycle time. The shorter the unusable retrace time in comparison to the usable display time, the greater the duty cycle will be. A typical duty cycle for such a system may be about 75%. Even with a very expensive scanner system, a duty cycle of 90% may be difficult to achieve. This is because physical limitations of the scanner systems (for example, maximum speed and minimum turnaround time limitations) make further reduction of unusable time difficult to achieve. Note that the unusable time in progressive scanning is not only due to the retracing per se, but also due to the unusable time as the scanner slows and changes direction between the optical scan and the retracing.

Figure 4:
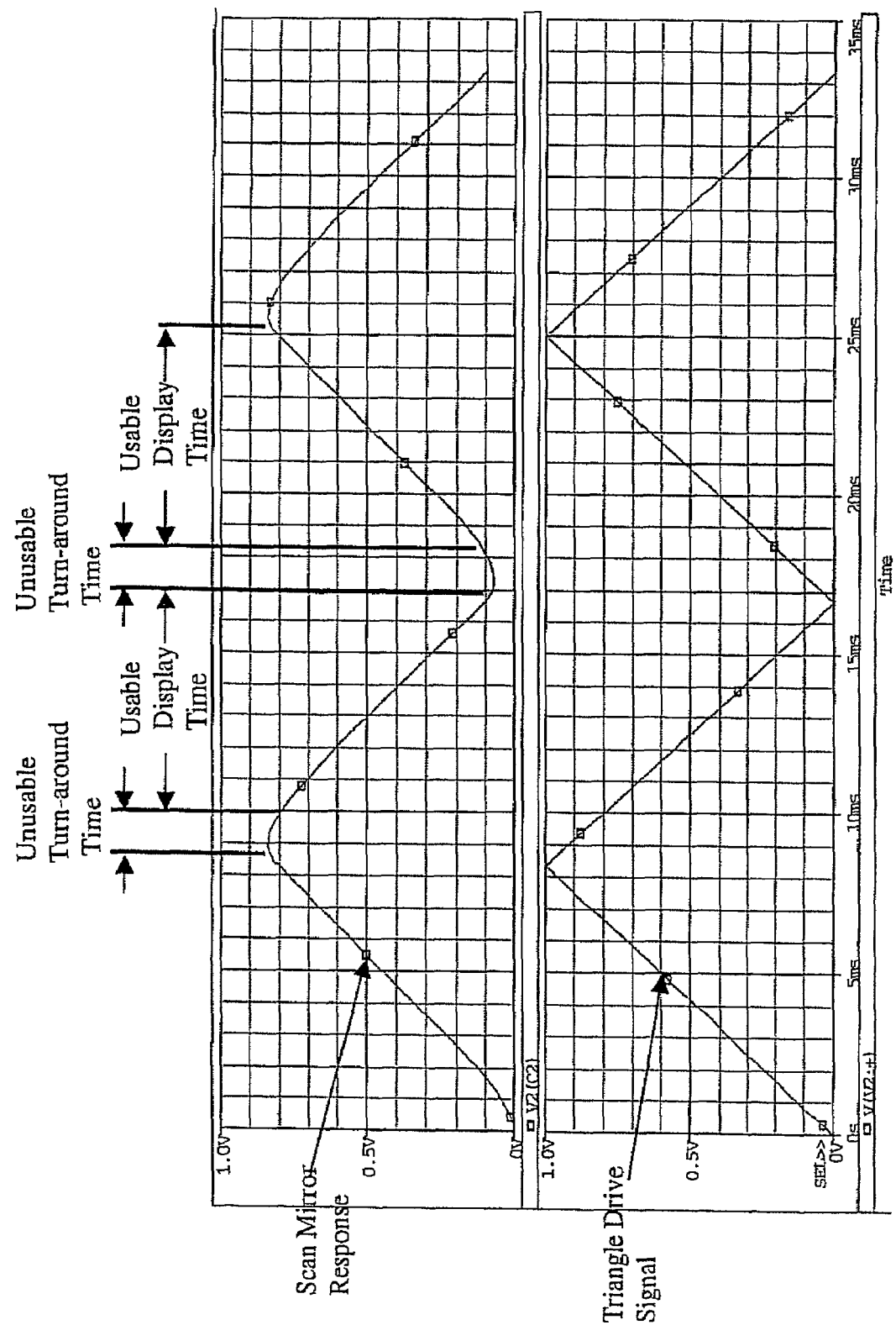
FIG. 4 is a timing diagram depicting a triangular drive signal and corresponding scan mirror response in accordance with an embodiment of the present invention.

FIG. 4 is a timing diagram depicting a triangular drive signal and corresponding scan mirror response in accordance with an embodiment of the present invention. As shown in the bottom portion of FIG. 4, a triangular drive signal (also called a triangular scan signal) may be generated and used to drive the scan mirror. During each cycle of the triangular signal, a first segment goes from a first voltage (for example, zero volts) to a second voltage (for example, one volt), and a second segment goes from the second voltage back to the first voltage. As depicted, the first segment is typically the same length and the same steepness as the second segment.

The scan mirror response to the triangular scan signal is shown in the top portion of FIG. 4. The scan mirror response generally follows the triangular scan signal and so the scan mirror response also has a triangular shape. However, because of physical limitations of the scan mirror mechanisms, the slope of the scan mirror response cannot change as quickly as the slope of the scan signal can change. Hence, the tips of the scan mirror response are rounded in comparison to the tips of the triangular scan signal.

The first segment of the scan mirror response provides a first usable display time during which the column of light moves across the screen in a "forward" direction (for example, from left to right). Meanwhile, the second segment of the scan mirror response provides a second usable display time during which the column of light moves across the screen in a "reverse" direction (for example, from right to left). In between the first and second segments (and between the second and first segments), an unusable turn-around time exists. The unusable turnaround time is due to the physical limitations of the scanner system.

Figure 5A:
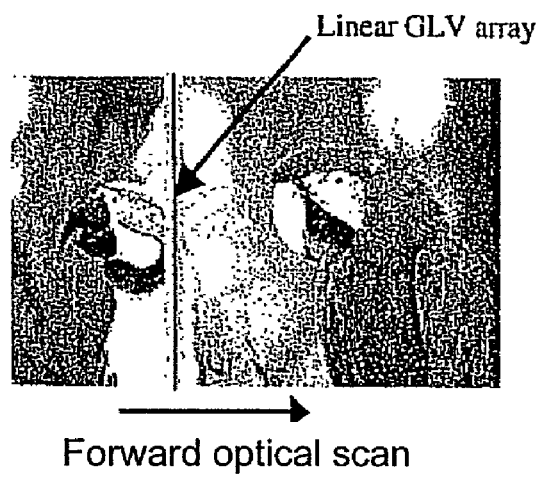
FIGS. 5A and 5B are illustrations depicting a forward optical scan and a reverse optical scan in accordance with an embodiment of the present invention.
Figure 5B:
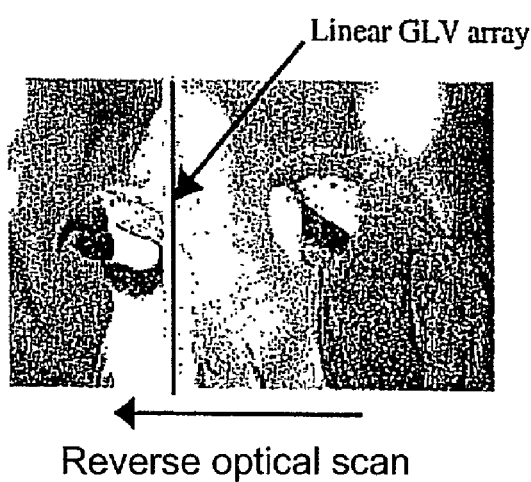

FIGS. 5A and 5B are illustrations depicting a forward optical scan and a reverse optical scan in accordance with an embodiment of the present invention. The example of FIG. 5A corresponds to the forward optical scan. FIG. 5A indicates a position of the column of pixels provided by the linear GLV (or other similar) array as the column sweeps in a forward direction across the 2D image, for example, from left to right. This forward optical scan corresponds to the first usable display time.

The example of FIG. 5B corresponds to the reverse optical scan. FIG. 5B indicates a position of the column of pixels provided by the linear GLV (or other similar) array as the column sweeps in a reverse direction across the 2D image, for example, from right to left. This reverse optical scan corresponds to the second usable display time.

FIG. 6 is a flow chart depicting a method for bi-directional progressive scanning in accordance with an embodiment of the present invention. The method 600 as depicted includes five steps (602, 604, 606, 608, 610, 612, 614, and 616).

In the first step 602, the first segment of the scan signal is provided. This step 602 corresponds to providing one segment (for example, the positively-sloped segment) of the triangular drive signal as illustrated in FIG. 4.

In the second step 604, the column (or row) of pixels is optically scanned in the forward direction to display the 2D image in response to the first segment of the scan signal. This step 604 corresponds to the forward optical scan illustrated in FIG. 5A.

In the third step 606, turnaround occurs such that the motion of the scanner slows, stops, and then reverses direction. This step 606 corresponds to the unusable turnaround time after the first segment (and before the second segment) as illustrated in FIG. 4.

In the fourth step 608, the method 600 proceeds to a next image. The next image may comprise, for example, a next frame of a video sequence. Alternatively, the next image may be a refresh of the same frame of the video sequence.

In the fifth step 610, the second segment of the scan signal is provided. This step 610 corresponds to providing the other segment (for example, the negatively-sloped segment) of the triangular drive signal as illustrated in FIG. 4.

In the sixth step 612, the column (or row) of pixels is optically scanned in the reverse direction to display the 2D image in response to the second segment of the scan signal. This step 612 corresponds to the reverse optical scan illustrated in FIG. 5B.

In the seventh step 614, turnaround again occurs such that the motion of the scanner slows, stops, and then reverses direction. This step 614 corresponds to the unusable turnaround time after the second segment (and before the first segment) as illustrated in FIG. 4.

Lastly, in the eighth step 616, the method 600 proceeds to a next image. Again, the next image may comprise, for example, a next frame of a video sequence. Alternatively, the next image may be a refresh of the same frame of the video sequence. Subsequently, the method 600 begins again starting with the first step 602.

The efficiency or duty cycle of the bi-directional progressive scanning depicted in FIGS. 4–6 is given by the usable display time divided by the cycle time. The shorter the turnaround time in comparison to the usable display time, the greater the duty cycle will be. Because the method 600 of FIG. 6 accomplishes bi-directional progressive scanning, the need for retracing is avoided. This results in higher achievable efficiencies. Duty cycles of greater than 95% may be achievable with bi-directional progressive scanning in accordance with the present invention.

Note that while the drive (scan) signal is depicted as a sharp triangle in FIG. 4, in other embodiments, the drive signal may not be as sharp. Hence, an approximate triangular scan signal may also be used. If such an approximate triangular scan signal does not have a constant slope in the (usable) optical scanning portions, then the non-constant slope may be compensated for by adjusting the brightness of the illumination. The lower the slope, the longer time a column is displayed, so the less bright the illumination needed. Conversely, the steeper the slope, the shorter time a column is displayed, so the more bright the illumination needed.

Figure 7:
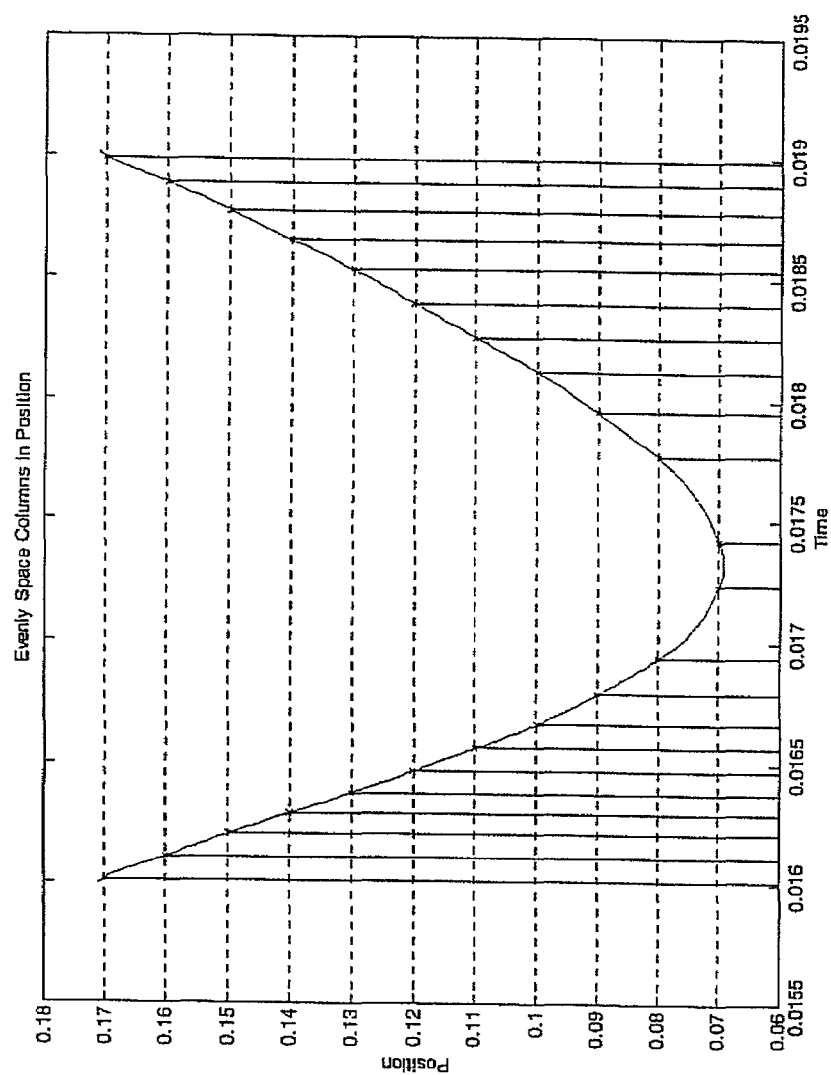
FIG. 7 is a graph depicting scan mirror position as a function of time near a "tip" of the triangular scan in accordance with an embodiment of the present invention. At the tip, the direction of motion of the scan mirror changes.

FIG. 7 is a graph depicting scan mirror position (y-axis) as a function of time (x-axis) near a "tip" of the triangular scan in accordance with an embodiment of the present invention. At the tip, the direction of motion of the scanner changes. In order to change direction, the scanner needs to decelerate (slow down) until it stops for an instant, then accelerate (speed up) in the new direction.

In one embodiment of the invention, when the scanner starts to slow substantially, then the usable optical scanning ends and the unusable turnaround time begins. In an alternate embodiment of the invention, the usable optical scanning time may be extended into the period where the scanner slows substantially. In order to do this, the increasing slowness of the scanning must be compensated for because the longer the scanner remains at a particular position, the brighter that column will appear. One way to compensate for the increasing slowness of the scanning would be to proportionally decrease the brightness of the incident light illuminating the linear array.

Figure 8:
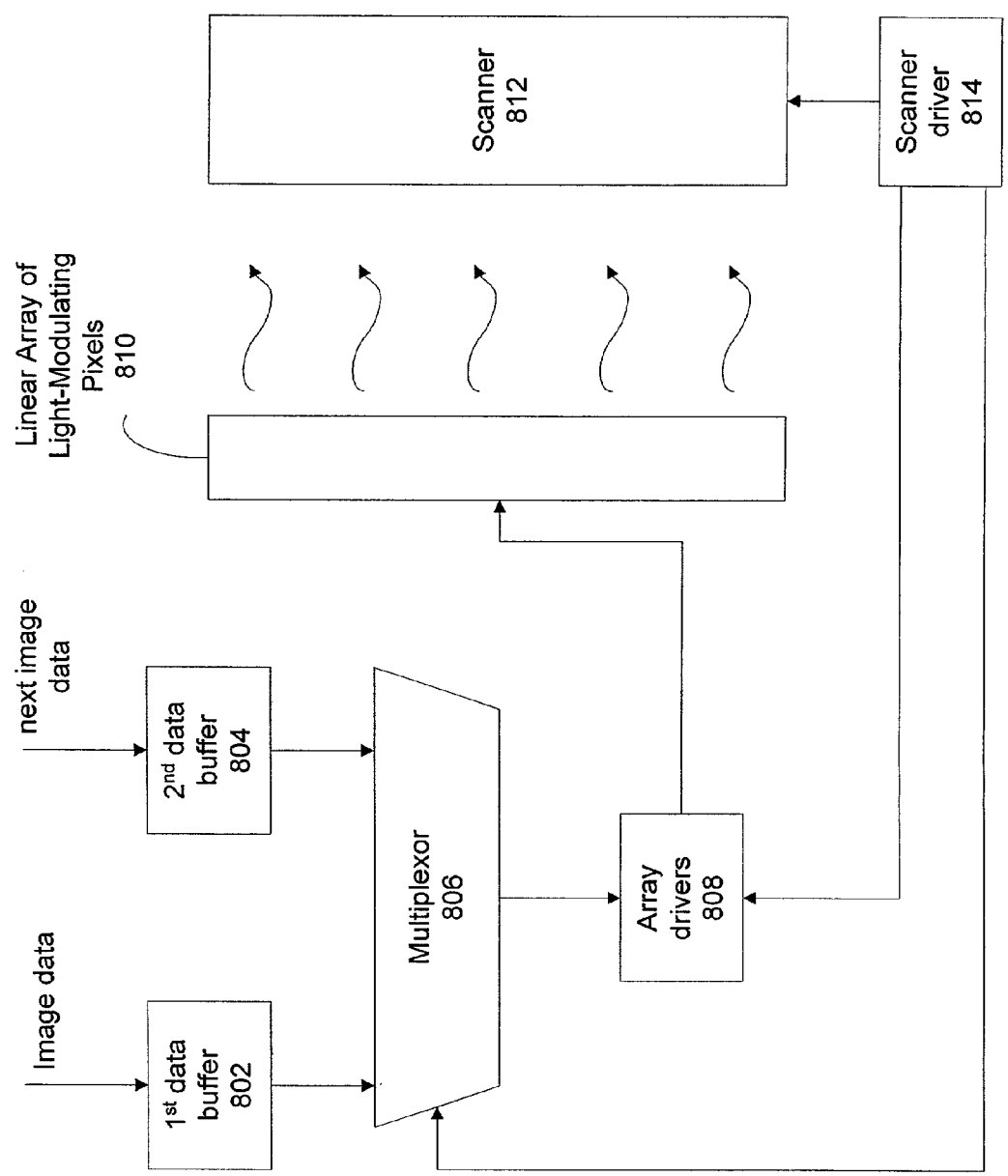
FIG. 8 is a block diagram depicting an apparatus for bi-directional progressive scanning in accordance with an embodiment of the present invention.

FIG. 8 is a block diagram depicting an apparatus for bi-directional progressive scanning in accordance with an embodiment of the present invention. As depicted in FIG. 8, the apparatus 800 includes two data buffers 802 and 804, a multiplexor 806, array drivers 808, a linear array of light-modulating pixels 810, a scanner 812, and a scanner driver 814.

The two data buffers 802 and 804 receive image data. In one embodiment of the invention, the first data buffer 802 receives image data that corresponds to a first image. The second data buffer 804 receives image data that corresponds to a second image. Image data for the third image is received by the first data buffer 802. Image data for the fourth image is received by the second data buffer 804. And so on, such that the first and second data buffers receive image data for alternate images to be presented.

The multiplexor 806 selects either the image data from the first data buffer 802 or the image data from the second data buffer 804. The multiplexor 806 transfers the selected data to array drivers 808. Array drivers 808 drive the linear array of light-modulating pixels 810 using the selected data to drive the linear array. In accordance with one embodiment, while the array drivers 808 use the image data from the first data buffer 802, the second data buffer 804 may be filling with the next image data. And, while the array drivers 808 use the next image data from the second data buffer 804, the first data buffer 802 may be filling with subsequent image data.

The linear array 810 transmits the modulated light to the scanner 812. The scanner 812 moves the column of modulated light across the screen in accordance with the scan signal provided by the scan driver 814.

As described above, the scan signal may comprise a triangular scan signal that is utilized to perform bi-directional progressive scanning. In that case, the scanner driver 814 provides a control signal to the array drivers 808 such that the array drivers 808 provide the image data in a "forward order" to the linear array during forward optical scans and provide the image data in a "reverse order" to the linear array during reverse optical scans.

The scanner driver 814 may also provide a control signal to the multiplexor 806. This control signal controls the multiplexor 806 and so controls how many times an image is refreshed before moving onto the next image. For example, if each image is refreshed three times before a next image is displayed, then the multiplexor 806 would be controlled to switch between the first 802 and second 804 data buffers only once every one-and-a-half cycles of the triangular scan signal. As another example, if each image is refreshed four times before a next image is displayed, then the multiplexor 806 would be controlled to switch between the first 802 and second 804 data buffers only once every two cycles of the triangular scan signal. As yet another example, if each image is refreshed five times before a next image is displayed, then the multiplexor 806 would be controlled to switch between the first 802 and second 804 data buffers only once every two-and-a-half cycles of the triangular scan signal. As yet another example, if each image is refreshed six times before a next image is displayed, then the multiplexor 806 would be controlled to switch between the first 802 and second 804 data buffers only once every three cycles of the triangular scan signal.

Now let us discuss image "flicker" and its impact on desirable refresh rates for bi-directional progressive scanning. It turns out that bi-directional progressive scanning using a system in accordance with the present invention may use a "bi-directional" screen refresh rate of about 120 hertz or more (refreshing about every 8.3 milliseconds or less) to make flicker unnoticeable to the typical viewer. These bi-directional screen refresh rates are about double what they would need to be for a uni-directional progressive scanning system. This is because for uni-directional scanning each scan starts from the same side of the screen (for example, the left side). This means that it only takes one scan cycle in time before any particular column is "re-painted." However, for bi-directional scanning, a scan starts from the side at which the previous scan ended. For example, if the prior scan ends at the right side, the following scan begins at the right side. This means that it may take up to almost two scan cycles in time before a particular column (for example, the left-most column) is "re-painted."

In one specific embodiment of the invention, the images received correspond to source material from film that is produced at about twenty-four hertz rate (24 images per second or one image about every 42 milliseconds). In this case, if the images were "bi-directionally" refreshed only once per image, then the viewer likely notice a significant amount of flicker. This is because the bi-directional screen refresh rate would be 24 hertz, and the effective uni-directional screen refresh rate would be merely 12 hertz. In order to minimize flicker for a typical viewer, such 24-image-per-second video should be bi-directionally refreshed at least five times per image. This corresponds to a bi-directional screen refresh rate of about 120 hertz (60 hertz triangular wave into the scan mirror) and an effective uni-directional screen refresh rate of about 60 hertz. Alternatively, the 24 image-per-second video should be bi-directionally refreshed at least six times per image. This corresponds to a bi-directional screen refresh rate of about 144 hertz (72 hertz triangular wave into the scan mirror) and an effective uni-directional screen refresh rate of about 72 hertz. In other implementations, higher bi-directional refresh rates (168 hertz, 192 hertz, 216 hertz, etc.) may be used to further reduce flicker.

In another specific embodiment of the invention, the images received correspond to source material from a television signal that is produced at about thirty hertz (30 images per second or one image about every 33 milliseconds). Again, if the images were "bi-directionally" refreshed only once per image, then the viewer would likely notice a significant amount of flicker. This is because the bi-directional screen refresh rate would be 30 hertz, and the effective uni-directional screen refresh rate would be merely 15 hertz. In order to minimize flicker for a typical viewer, such 30-image-per-second video should be bi-directionally refreshed at least four times per image. This corresponds to a bi-directional screen refresh rate of about 120 hertz (60 hertz triangular wave into the scan mirror) and an effective uni-directional screen refresh rate of about 60 hertz. In other implementations, higher bi-directional refresh rates (150 hertz, 180 hertz, 210 hertz, etc.) may be used to further reduce flicker.

The multiple refreshes of a single image may further be used to increase the displayable information per pixel. This may be accomplished by dithering of the image data between different refreshes of the image. For example, if four refreshes are used per image, then the displayable grayscale resolution per pixel may be increased by two bits, say from 8-bit resolution to 10-bit resolution. Note that the dithering will introduce a lower frequency to the screen refresh rate, but it turns out that noticeable image flicker will generally not be introduced by such dithering. This is because the intensity changes between dithered images are very small (less than 1% in 8-to-10 bit dithering), so detectable flicker is generally not introduced.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method for bi-directional progressive scanning in a display system, the method comprising:
   forward optical scanning of a line of pixels in a first direction; and
   reverse optical scanning of a line of pixels in a second direction opposite to the first direction,
   wherein the forward and reverse optical scanning are performed using a linear array of controllable light elements,
   wherein each optical scanning comprises a complete refresh of all lines in an image frame, and
   wherein at least two forward complete refreshes of all lines in the image frame and at least two reverse complete refreshes of all lines in the image frame are used to display the image frame.

2. The method of claim 1, wherein a triangular drive signal is applied to drive the forward and reverse optical scanning.

3. The method of claim 2, wherein the triangular drive signal comprises an approximate triangular drive signal.

4. The method of claim 2, wherein a first segment of the triangular drive signal drives the forward optical scanning, wherein a second segment of the triangular drive signal drives the reverse optical scanning, and wherein an average slope of the second segment is of opposite sign and of equal magnitude as an average slope of the first segment.

5. The method of claim 1, further comprising:
   temporarily storing the image data in a buffer;
   reading the image data in a forward order to perform the forward scanning; and
   reading the image data in a reverse order to perform the reverse scanning.

6. The method of claim 1, further comprising reducing a turnaround time needed to change direction by:
   reducing a slope of the triangular drive signal towards an end of the forward and reverse optical scanning in a way that reduces a rate at which the image data are presented; and
   attenuating a brightness towards the end of the forward and reverse scanning to compensate for the reduced rate.

7. The method of claim 1, wherein the controllable light elements comprise controllably diffracting pixels.

8. The method of claim 1, further comprising:
   receiving image data at a rate of about 30 images per second, wherein the at least four screen refreshes are used to display one image for a bi-directional screen refresh rate of at least 120 Hz.

9. The method of claim 1, further comprising:
receiving image data at a rate of about 24 images per second,
wherein at least five screen refreshes are used to display one image for a bi-directional screen refresh rate of at least 120 Hz.

10. The method of claim 1, further comprising:
dithering of image data between different optical scannings of the image to increase displayable resolution per pixel.

11. An apparatus for bi-directional progressive scanning, the apparatus comprising:
a linear array of controllable light elements; and
a scanner driver that drives a scanner apparatus using a drive signal,
wherein the drive signal is applied to drive both forward and reverse optical scanning of an image by the linear array such that each scanning comprises a complete refresh of all lines in an image frame, and
wherein at least two forward complete screen refreshes of all lines in the image frame and at least two reverse complete refreshes of all lines in the image frame are used to display the image frame.

12. The apparatus of claim 11, wherein the drive signal comprises a triangular drive signal.

13. The apparatus of claim 12, further:
means for reducing a slope of the drive signal towards an end of the forward and reverse scanning in a way that reduces a rate at which the image data are presented; and
means for attenuating a brightness towards the end of the forward and reverse scanning to compensate for the reduced presentation rate.

14. The apparatus of claim 11, further comprising:
a first buffer for temporarily storing image data for the image; and
a circuit for reading the image data in a forward order to perform the forward optical scanning and for reading the image data in a reverse order to perform the reverse optical scanning.

15. The apparatus of claim 14, further comprising:
a second buffer for temporarily storing image data for a next image,
wherein the second buffer may receive the image data for the next image while the image data from the first buffer is being displayed.

16. The apparatus of claim 15, wherein image data for subsequent images alternate between the buffer and the second buffer.

17. The apparatus of claim 11, wherein the controllable light elements comprise controllably diffracting pixels.

18. The apparatus of claim 11, further comprising:
means for dithering of the image data between different optical scannings of the image to increase displayable resolution per pixel.

19. A display system using optical scanning, the system comprising:
means for forward optical scanning of a line of pixels in a first direction; and
means for reverse optical scanning of a line of pixels in a second direction opposite to the first direction,
wherein the forward and reverse optical scanning are both performed using a linear array of controllable light elements, such that each scanning comprises a complete refresh of all lines in an image frame, and
wherein at least two forward complete screen refreshes of all lines in the image frame and at least two reverse complete refreshes of all lines in the image frame are used to display the image frame.

* * * * *